United States Patent
Tung

(10) Patent No.: US 12,474,402 B2
(45) Date of Patent: Nov. 18, 2025

(54) METHOD, SYSTEM, AND NON-TRANSITORY COMPUTER READABLE MEDIUM FOR VERIFYING PIN NAME

(71) Applicant: Fulian Precision Electronics (Tianjin) Co., LTD., Tianjin (CN)

(72) Inventor: Shun-Fu Tung, Taoyuan (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 560 days.

(21) Appl. No.: 18/072,543

(22) Filed: Nov. 30, 2022

(65) Prior Publication Data
US 2023/0384370 A1 Nov. 30, 2023

(30) Foreign Application Priority Data
May 31, 2022 (CN) .......................... 202210612712.3

(51) Int. Cl.
*G01R 31/317* (2006.01)

(52) U.S. Cl.
CPC . *G01R 31/31704* (2013.01); *G01R 31/31703* (2013.01)

(58) Field of Classification Search
CPC ........ G01R 31/31704; G01R 31/31703; G06F 2115/12; G06F 30/398
See application file for complete search history.

(56) References Cited

U.S. PATENT DOCUMENTS

| | | | |
|---|---|---|---|
| 7,117,471 B1* | 10/2006 | Li | G06F 30/30 716/139 |
| 7,168,041 B1 | 1/2007 | Durrill et al. | |
| 9,223,915 B1* | 12/2015 | Ginetti | G06F 30/367 |
| 2008/0097717 A1* | 4/2008 | Tokunaga | G01R 31/318516 702/119 |
| 2008/0140323 A1* | 6/2008 | Kumagai | G06F 30/30 702/57 |
| 2008/0141183 A1* | 6/2008 | Kumagai | G06F 30/30 716/139 |
| 2008/0141194 A1* | 6/2008 | Kumagai | G06F 30/30 716/112 |
| 2008/0141205 A1* | 6/2008 | Kumagai | G06F 30/18 716/139 |

(Continued)

FOREIGN PATENT DOCUMENTS

| | | | |
|---|---|---|---|
| CN | 112818616 A | | 5/2021 |
| TW | 200413975 A | | 8/2004 |

*Primary Examiner* — Nha T Nguyen
(74) *Attorney, Agent, or Firm* — ScienBiziP, P.C.

(57) ABSTRACT

A method, a system, and a non-transitory computer readable medium for verifying pin name include storing information of a plurality of components of a circuit to be verified; running the circuit to be verified, and generating a components pin report of the components; comparing the components pin report and the stored information of the components, to determine whether names of pins of the components of the circuit to be verified are correct; when the components pin report and the stored information of the components are different, determining that the name of the pins of the components of the circuit to be verified is incorrect; and when the components pin report and the stored information of the components are the same, determining that the name of the pins of the components of the circuit to be verified is correct.

17 Claims, 5 Drawing Sheets

(56) References Cited

U.S. PATENT DOCUMENTS

| | | | |
|---|---|---|---|
| 2008/0288907 A1* | 11/2008 | Laing | G06F 30/30 |
| | | | 716/103 |
| 2008/0301600 A1* | 12/2008 | Kumagai | G06F 30/30 |
| | | | 716/111 |
| 2009/0177701 A1* | 7/2009 | Ruffner | G06F 30/367 |
| 2017/0176525 A1* | 6/2017 | Changchien | G06T 7/001 |
| 2017/0249410 A1* | 8/2017 | Baker | G06F 30/367 |
| 2021/0192112 A1* | 6/2021 | Goel | G06F 30/323 |
| 2022/0335188 A1* | 10/2022 | Hsu | G06F 30/3323 |
| 2025/0190663 A1* | 6/2025 | Goel | G06F 30/392 |

\* cited by examiner

METHOD, SYSTEM, AND NON-TRANSITORY COMPUTER READABLE MEDIUM FOR VERIFYING PIN NAME

CROSS-REFERENCE TO RELATED APPLICATIONS

This application claims priority to Chinese Patent Application No. 202210612712.3 filed on May 31, 2022, in China National Intellectual Property Administration, the contents of which are incorporated by reference herein.

FIELD

The subject matter herein generally relates to circuit design technology, and particularly to a method, a system, and a non-transitory computer readable medium for verifying pin name.

BACKGROUND

When naming for chip pins in the circuit design technology, pins for operating bit motion are usually named with a name suffix N, pins for operating high level motion may not be named with the name suffix N. During a circuit developing process, pins may be mistakenly named, which may result in the whole circuit be rearranged and manually checked. Manually checking for mistakes are not efficient, and erroneous determination may easily happen. Thus, a method for precisely and rapidly verifying the naming of the chip pins in the circuit design is needed.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
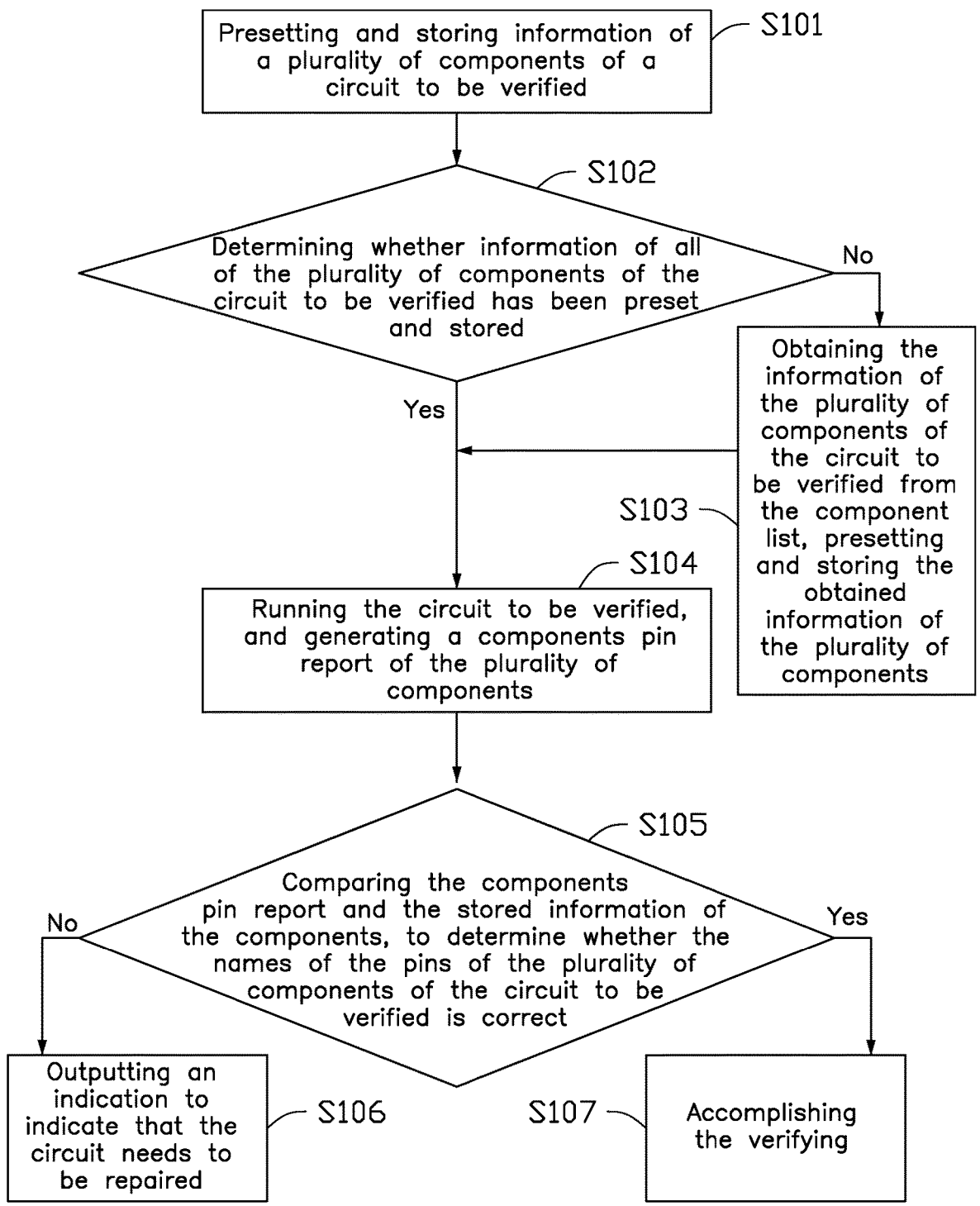
FIG. 1 illustrates a flowchart of at least one embodiment of a method for verifying pin name.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

The present disclosure provides a method for verifying pin name, the method can run a circuit to be verified according to basic design toolkit Allegro PCB Designer, and generate a components pin report. The components pin report may include positions of the component, pins, and names of the pins. Comparing predetermined component specification based on the components pin report to verify whether the names of the component pins are correct. The method further supplies information of the components needed during verifying according to component list generated by running programs of OrCAD.

When pins of the component are named with a name suffix N, so the signals of the pins are low level signals. When pins of the component are not named with the name suffix N, so the signals of the pins are high level signals.

When input and output signals of the component both are low level signals or high level signals, a logical output manner of the component may be a co-direction logical output. When input and output signals of the component are different, such as the input signal is a low level signal, the output signal is a high level signal, the logical output manner of the component may be a reverse direction logical output. Based on the logical output manner of the component and signals of the pins, verifying whether the name of the pin is correct.

FIG. 1 illustrates a flowchart of at least one embodiment of a method for verifying pin name. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S101.

At block S101, presetting and storing information of a plurality of components of a circuit to be verified.

In at least one embodiment, the preset information of components may be electrical specifications of the components, including input pins and corresponding output pins of the components, and logical output manners of the components (such as the co-direction logical output and the reverse direction logical output).

At block S102, determining whether information of all of the plurality of components of the circuit to be verified has been preset and stored.

When information of some components of the circuit to be verified is determined to be not preset and stored, presetting and storing information of the plurality of components according to the component list, then the method goes to block S103.

When information of all of the plurality of components of the circuit to be verified is determined to be preset and stored, then the method goes to block S104.

At block S103, obtaining the information of the plurality of components of the circuit to be verified from the component list, presetting and storing the obtained information of the plurality of components, then the method goes to block S104.

At block S104, running the circuit to be verified, and generating a components pin report of the plurality of components.

In at least one embodiment, after running the circuit to be verified, the components pin report is generated, the components pin report may include material numbers of the components of the circuit to be verified, positions of the components, information of pins of the components, and names of pins.

At block S105, comparing the components pin report and the stored information of the components, to determine whether the names of the pins of the plurality of components of the circuit to be verified is correct.

When the components pin report and the stored information of the components are different, determining that the names of the pins of the components of the circuit to be verified is determined to be incorrect, then the method goes to block S106.

When the components pin report and the stored information of the components are the same, determining that the names of the pins of the components of the circuit to be verified is correct, then the method goes to block S107.

At block S106, outputting an indication to indicate that the circuit needs to be repaired.

At block S107, accomplishing the verifying.

Figure 2:
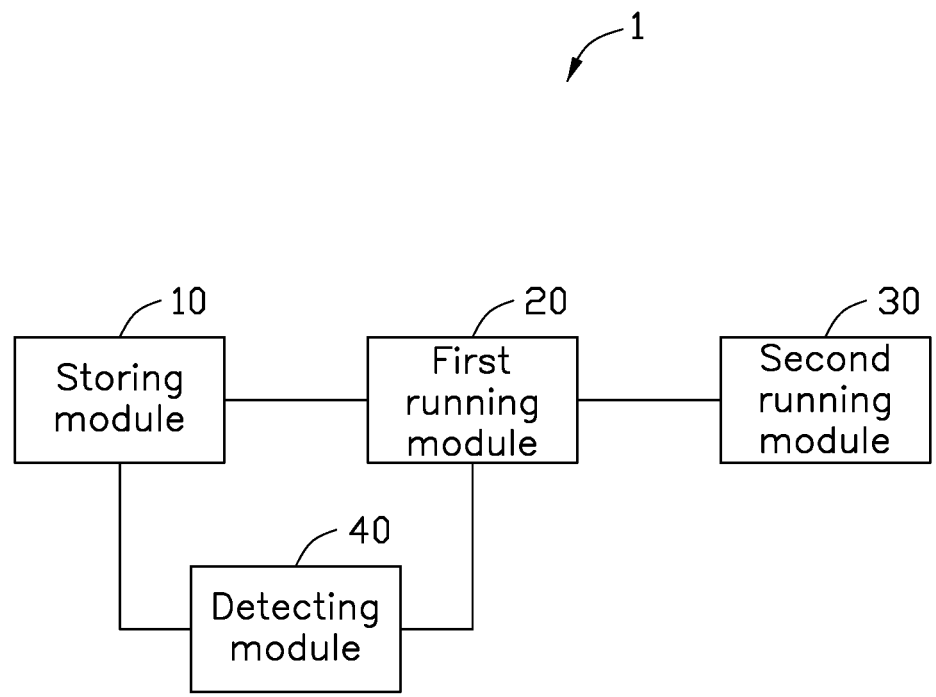
FIG. 2 is a schematic view of at least one embodiment of a system for verifying pin name.

FIG. 2 illustrates a schematic view of at least one embodiment of a system 1 for verifying pin name. The system 1 may be configured to apply the method for verifying pin name. The system 1 includes a storing module 10, a first running module 20, a second running module 30, and a detecting module 40.

The storing module 10 may be configured to preset and store information of a plurality of components of a circuit to be verified. The stored information of the components can be regarded as a verifying standard.

The first running module 20 can be a basic design toolkit including programs for running the circuit to be verified, through running the circuit to be verified to generate the components pin report, that is the information of the components of the circuit to be verified.

The second running module 30 can be the OrCAD, the OrCAD can generate the component list, including information of the components. In at least one embodiment, when the storing module 10 lacks of the information of the components of the circuit to be verified, the information of the components can be obtained from the second running module 30 and further be preset and stored.

The detecting module 40 includes predetermined programs configured to compare the components pin report generated in the first running module 20 and the information of the components of the circuit to be verified stored in the storing module 10, so as to detect whether the names of the pins of the components of the circuit to be verified are correct.

Figure 3:
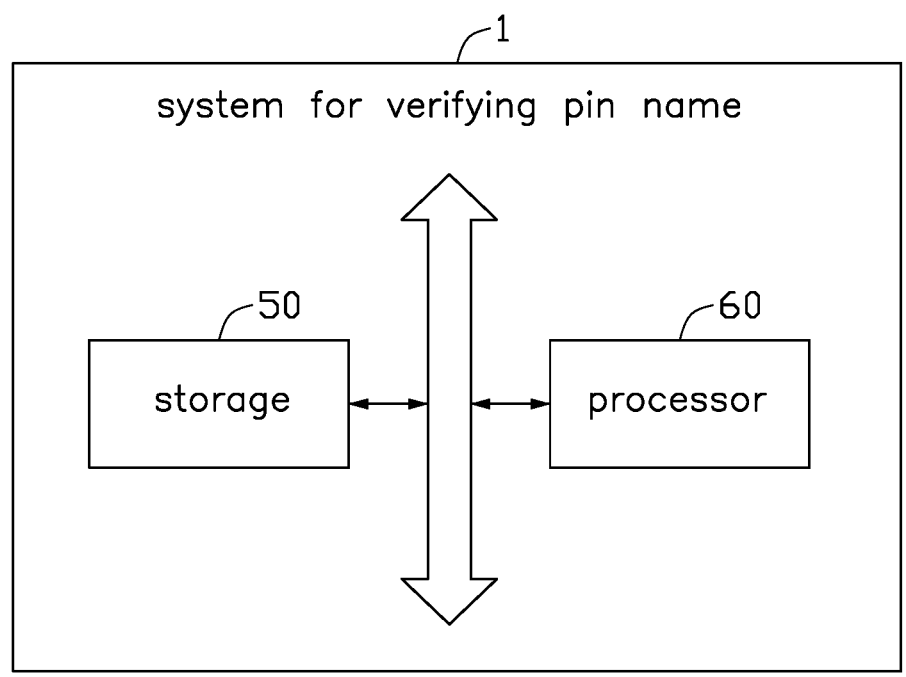
FIG. 3 is another schematic view of at least one embodiment of the system for verifying pin name.

FIG. 3 illustrates another schematic view of at least one embodiment of the system 1 for verifying pin name. In at least one embodiment, the system 1 includes a storage 50 and at least one processor 60. It should be known by one ordinary skilled in the art that, the system 1 shown in FIG. 3 is not limited by the present disclosure, the system 1 may include more or less components or software, or other arrangements.

In at least one embodiment, system 1 may be a terminal that can automatically compute and/or process data and information. The at least one processor 60 can be formed by integrated circuits, such as an individual integrated circuit or multiple integrated circuits with a same function or different functions. The at least one processor 60 includes, but is not limited to, a central processing unit (CPU), a microprocessor, a digital signal processor (DSP), a graphics processor, an application specific integrated circuit (ASIC), a field-programmable gate array (FPGA), a data processor chip, a programable logic device (PLD), a discrete gate/transistor logic device, or a discrete hardware component. The at least one processor 60 may be a control unit and electrically connected to other elements of the system 1 through interfaces or a bus. In at least one embodiment, the various types of non-transitory computer-readable storage mediums stored in the storage 50 can be processed by the at least one processor 60 to perform various functions.

In at least one embodiment, the storage 50 can include various types of non-transitory computer-readable storage mediums. The storage 50 can rapidly and automatically access instructions and data when the system 1 is running. The storage 50 can be an internal storage system, such as a flash memory, a Random Access Memory (RAM) for the temporary storage of information, and/or a Read-Only Memory (ROM), a Programmable Read-Only Memory (PROM), Erasable Programmable Read-Only Memory (EPROM), a One-time Programmable Read-Only Memory (OTPROM), Electrically-Erasable Programmable Read-Only Memory (EEPROM), and a Compact Disc Read-Only Memory (CD-ROM) for the permanent storage of information. The storage 50 can also be an external storage system, such as a hard disk, a storage card, or a data storage medium.

A non-transitory computer-readable storage medium including program instructions for causing the computer apparatus (such as personal computer, device, or network device, etc.) or the processor to perform the method for verifying pin name is also disclosed.

In at least one embodiment, the various types of non-transitory computer-readable storage mediums stored in the storage 50 can be processed by the at least one processor 60 to perform various functions, such as the method for verifying pin name.

Figure 4:
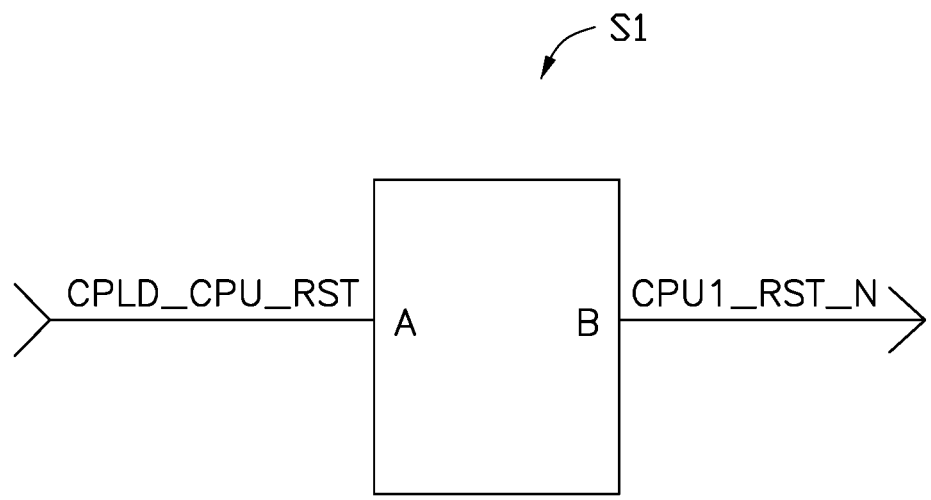
FIG. 4 is a schematic view of at least one embodiment of a first component.

FIG. 4 illustrates a schematic view of at least one embodiment of a first component S1. In at least one embodiment, the first component S1 can be an example for describing the method for verifying pin name.

In at least one embodiment, the first component S1 can be a Dual N-MOS component, a material number can be DMN601DWK-7, a logical output manner of the first component S1 preset and stored in the storing module 10 can be a reverse direction logical output.

In at least one embodiment, the first component S1 includes a first pin A and a second pin B. The first pin A may be an input, the second pin B may be an output corresponding to the first pin A. The name of the first pin A may be CPLD_CPU_RST, excluding the name suffix N, the signal of the first pin A is a high level signal. The name of the second pin B may be CPU1_RST_N, including the name suffix N, the signal of the second pin B is a low level signal. Thus, the logical output manner of the first component S1 is a reverse direction logical output.

The running result of the first component S1 the information of the components stored in the storing module 10 are in accordance, through the method for verifying pin name, the name of the first pin A and the second pin B of the first component S1 is correct.

Figure 5:
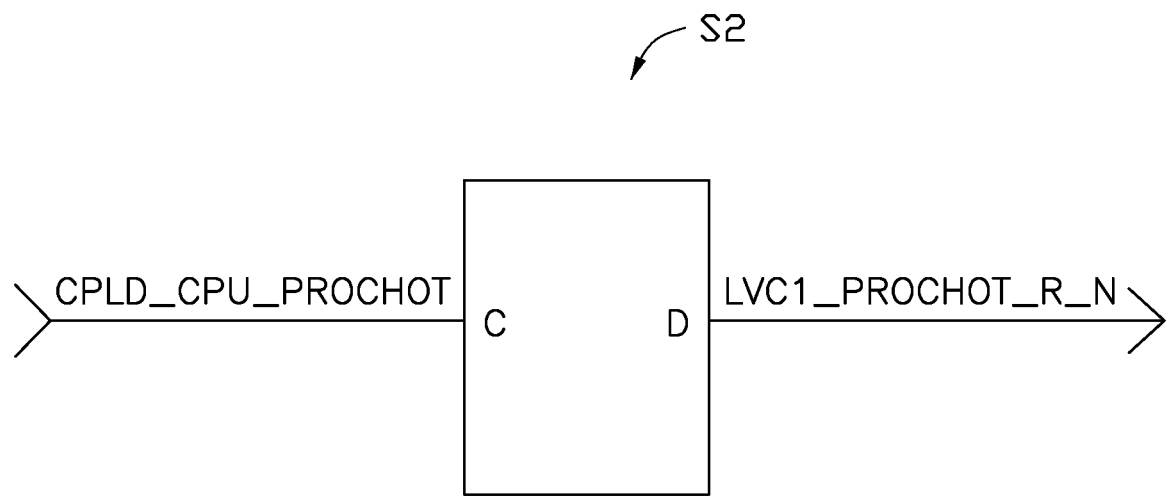
FIG. 5 is a schematic view of at least one embodiment of a second component.

FIG. 5 is a schematic view of at least one embodiment of a second component S2. In at least one embodiment, the second component S2 can be an example for describing the method for verifying pin name.

In at least one embodiment, the second component S2 can be a GTL transceiver component, a material number can be GTL2014PW, a logical output manner of the second component S2 preset and stored in the storing module 10 can be a co-direction logical output.

In at least one embodiment, the second component S2 includes a third pin C and a fourth pin D. The third pin C may be an input, the fourth pin D may be an output corresponding to the third pin C. The name of the third pin C may be CPLD_CPU_PROCHOT, excluding the name suffix N, the signal of the third pin C is a high level signal. The name of the fourth pin D may be LVC1_PROCHOT_R_N, including the name suffix N, the signal of the fourth pin D is a low level signal. Thus, the logical output manner of the second component S2 is a reverse direction logical output.

The running result of the first component S1 the information of the components stored in the storing module 10 are different, through the method for verifying pin name, the name of the third pin C and the fourth pin D of the second component S2 is correct.

The method for verifying pin name of the present disclosure, presetting and storing information of components in the storing module 10, running the first running module 20 and the second running module 30, determining whether the names of the pins of the components are corresponding to that preset through the detecting module 40. That is, running the circuit to be verified according to programs of the first running module 20, to generate a components pin report, then the detecting module 40 compares the components pin report and the preset component specification, to determine whether the names of the pins of the components are correct. Meanwhile, supplying information of the components needed during verifying according to component list generated by running programs of the second running module 30. Therefore, an efficiency and a precision of verifying pin name can be improved.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for verifying pin name comprising:
   storing information of a plurality of components of a circuit to be verified;
   running the circuit to be verified, and generating a components pin report of the plurality of components, the components pin report comprising information of pins of the plurality of components and names of the pins of the plurality of components;
   comparing the components pin report and the stored information of the plurality of components, to determine whether the names of the pins of the plurality of components of the circuit to be verified are correct;
   in response that the components pin report and the stored information of the plurality of components are different, determining that the names of the pins of the plurality of components of the circuit to be verified is incorrect;
   in response that the components pin report and the stored information of the plurality of components are the same, determining that the names of the pins of the plurality of components of the circuit to be verified is correct;
   based on a logical output manner of each of the plurality of components and a determined signal of the pins, determining whether the names of the pins are correct;
   in response that a determined signal of an input pin of one of the plurality of components and a determined signal of an output pin of the corresponding component are the same, the logical output manner of the plurality of components is a co-direction logical output; and
   in response that the determined signal of the input pin of one of the plurality of components and the determined signal of the output pin of the corresponding component are different, the logical output manner of the plurality of components is a reverse direction logical output.

2. The method according to claim 1, before running the circuit to be verified, the method further comprising:
   determining whether information of all of the plurality of components of the circuit to be verified has been preset and stored;
   when information of some components of the circuit to be verified is determined to be not preset and stored, presetting and storing information of the plurality of components according to a component list; and
   when information of all of the plurality of components of the circuit to be verified is determined to be preset and stored, running the circuit to be verified.

3. The method according to claim 1, wherein
   when a name suffix of one of the pins of the component comprises a predetermined letter, determine a signal of the pin is a first signal; and
   when a name suffix of one of the pins of the component excludes the predetermined letter, determine the signal of the pin is a second signal.

4. The method according to claim 3, further comprising:
   when a stored logical output manner of the component and the determined logical output manner of the component of the circuit to be verified are the same, determining that the name of the pin of the component of the circuit to be verified is correct; and
   when the stored logical output manner of the component and the determined logical output manner of the component of the circuit to be verified are different, determining that the name of the pin of the component of the circuit to be verified is incorrect.

5. The method according to claim 1, further comprising:
when the name of the pin of the component of the circuit to be verified is determined to be incorrect, outputting an indication to indicate that the circuit needs to be repaired.

6. A system for verifying pin name comprising:
a storing module, the storing module is configured to store information of a plurality of components of a circuit to be verified;
a first running module, the first running module is configured to run the circuit to be verified and generate a components pin report of the plurality of components, the components pin report comprising information of pins of the plurality of components and names of the pins of the plurality of components;
a detecting module, the detecting module is configured to compare the components pin report and the stored information of the plurality of components, to determine whether the names of the pins of the plurality of components of the circuit to be verified are correct;
wherein in response that the components pin report and the stored information of the plurality of components are different, the detecting module determines that the names of the pins of the plurality of components of the circuit to be verified is incorrect; and
in response that the components pin report and the stored information of the plurality of components are the same, the detecting module determines that the names of the pins of the plurality of components of the circuit to be verified is correct;
wherein the detecting module is further configured to based on a logical output manner of each of the plurality of components and a determined signal of the pins, the detecting module determines whether the names of the pins are correct;
in response that a determined signal of an input pin of one of the plurality of components and a determined signal of an output pin of the corresponding component are the same, the logical output manner of the plurality of components is a co-direction logical output; and
in response that the determined signal of the input pin of one of the plurality of components and the determined signal of the output pin of the corresponding component are different, the logical output manner of the plurality of components is a reverse direction logical output.

7. The system according to claim 6, wherein the storing module is further configured to determine whether information of all of the plurality of components of the circuit to be verified has been preset and stored;
when information of some components of the circuit to be verified is determined to be not preset and stored, the storing module presets and stores information of the plurality of components according to a component list; and
when information of all of the plurality of components of the circuit to be verified is determined to be preset and stored, the first running module runs the circuit to be verified.

8. The system according to claim 7, further comprising a second running module, wherein the second running module is configured to generate the component list, the component list comprises information of the components.

9. The system according to claim 8, wherein when the storing module lacks of the information of the components of the circuit to be verified, the information of the components is obtained from the second running module and further be preset and stored.

10. The system according to claim 6, wherein
when a name suffix of one of the pins of the component comprises a predetermined letter, the detecting module determines a signal of the pin is a first signal; and
when a name suffix of one of the pins of the component excludes the predetermined letter, the detecting module determines the signal of the pin is a second signal.

11. The system according to claim 10, wherein the detecting module is further configured to
when a stored logical output manner of the component and the determined logical output manner of the component of the circuit to be verified are the same, determine that the name of the pin of the component of the circuit to be verified is correct; and
when the stored logical output manner of the component and the determined logical output manner of the component of the circuit to be verified are different, determine that the name of the pin of the component of the circuit to be verified is incorrect.

12. The system according to claim 6, wherein the detecting module is further configured to
when the name of the pin of the component of the circuit to be verified is determined to be incorrect, the detecting module outputs an indication to indicate that the circuit needs to be repaired.

13. A non-transitory computer readable medium comprising program instructions for causing an apparatus to perform at least the follow:
storing information of a plurality of components of a circuit to be verified;
running the circuit to be verified, and generating a components pin report of the plurality of components, the components pin report comprising information of pins of the plurality of components and names of the pins of the plurality of components;
comparing the components pin report and the stored information of the plurality of components, to determine whether the names of the pins of the plurality of components of the circuit to be verified are correct;
in response that the components pin report and the stored information of the plurality of components are different, determining that the names of the pins of the plurality of components of the circuit to be verified is incorrect;
in response that the components pin report and the stored information of the plurality of components are the same, determining that the names of the pins of the plurality of components of the circuit to be verified is correct;
wherein the program instructions for causing an apparatus to further perform at least the follow:
based on a logical output manner of each of the plurality of components and a determined signal of the pins, determining whether the names of the pins are correct;
in response that a determined signal of an input pin of one of the plurality of components and a determined signal of an output pin of the corresponding component are the same, the logical output manner of the plurality of components is a co-direction logical output; and
in response that the determined signal of the input pin of one of the plurality of components and the determined signal of the output pin of the corresponding component are different, the logical output manner of the plurality of components is a reverse direction logical output.

14. The non-transitory computer readable medium according to claim 13, before running the circuit to be verified, the program instructions for causing an apparatus to further perform at least the follow:
   determining whether information of all of the plurality of components of the circuit to be verified has been preset and stored;
   when information of some components of the circuit to be verified is determined to be not preset and stored, presetting and storing information of the plurality of components according to a component list; and
   when information of all of the plurality of components of the circuit to be verified is determined to be preset and stored, running the circuit to be verified.

15. The non-transitory computer readable medium according to claim 13, wherein
   when a name suffix of one of the pins of the component comprises a predetermined letter, determine a signal of the pin is a first signal; and
   when a name suffix of one of the pins of the component excludes the predetermined letter, determine the signal of the pin is a second signal.

16. The non-transitory computer readable medium according to claim 15, wherein the program instructions for causing an apparatus to further perform at least the follow:
   when a stored logical output manner of the component and the determined logical output manner of the component of the circuit to be verified are the same, determining that the name of the pin of the component of the circuit to be verified is correct; and
   when the stored logical output manner of the component and the determined logical output manner of the component of the circuit to be verified are different, determining that the name of the pin of the component of the circuit to be verified is incorrect.

17. The non-transitory computer readable medium according to claim 13, wherein the program instructions for causing an apparatus to further perform at least the follow:
   when the name of the pin of the component of the circuit to be verified is determined to be incorrect, outputting an indication to indicate that the circuit needs to be repaired.

* * * * *